(12) United States Patent
Pilolli et al.

(10) Patent No.: US 12,518,816 B2
(45) Date of Patent: Jan. 6, 2026

(54) WRITE DUTY CYCLE CALIBRATION ON A MEMORY DEVICE

(71) Applicant: Micron Technology, Inc., Boise, ID (US)

(72) Inventors: Luigi Pilolli, L'Aquila (IT); Guan Wang, San Jose, CA (US); Rosario D'Esposito, Avezzano (IT); Andrew Proescholdt, Rancho Cordova, CA (US); Lucia Botticchio, Pescina (IT); Luca Di Loreto, Capistrello (IT)

(73) Assignee: Micron Technology, Inc., Boise, ID (US)

( * ) Notice: Subject to any disclaimer, the term of this patent is extended or adjusted under 35 U.S.C. 154(b) by 162 days.

(21) Appl. No.: 18/225,878

(22) Filed: Jul. 25, 2023

(65) Prior Publication Data

US 2024/0046976 A1    Feb. 8, 2024

Related U.S. Application Data

(60) Provisional application No. 63/395,147, filed on Aug. 4, 2022.

(51) Int. Cl.
*G11C 11/4076* (2006.01)
*G11C 11/4096* (2006.01)
*G11C 11/4099* (2006.01)

(52) U.S. Cl.
CPC ...... *G11C 11/4076* (2013.01); *G11C 11/4096* (2013.01); *G11C 11/4099* (2013.01); *G11C 2207/2254* (2013.01)

(58) Field of Classification Search
CPC ............ G11C 11/4076; G11C 11/4096; G11C 11/4099; G11C 2207/2254
See application file for complete search history.

(56) References Cited

U.S. PATENT DOCUMENTS

| | | | | |
|---|---|---|---|---|
| 2012/0250426 A1* | 10/2012 | Huang | ................. | G11C 7/1066 365/189.11 |
| 2020/0133542 A1* | 4/2020 | Kim | ...................... | G06F 3/0659 |
| 2022/0270665 A1* | 8/2022 | Park | ..................... | G11C 29/022 |

\* cited by examiner

*Primary Examiner* — Min Huang
(74) *Attorney, Agent, or Firm* — Lowenstein Sandler LLP

(57) ABSTRACT

Operations include generating a voltage level associated with a digital signal corresponding to a write operation associated with one or more memory cells of a memory device, comparing the voltage level to a reference voltage level to generate a comparison result, generating based on the comparison result, a command to adjust a duty cycle associated with the digital signal; and adjusting the duty cycle associated with digital signal based on the command.

20 Claims, 11 Drawing Sheets

WRITE DUTY CYCLE CALIBRATION ON A MEMORY DEVICE

CROSS-REFERENCE TO RELATED APPLICATION

This application claims the benefit of U.S. Provisional Application No. 63/395,147, titled "Write Duty Cycle Calibration on a Memory Device," filed Aug. 4, 2022, the entire disclosure of which is incorporated herein by reference.

TECHNICAL FIELD

Embodiments of the disclosure relate generally to memory sub-systems, and more specifically, relate to write duty cycle calibration on a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
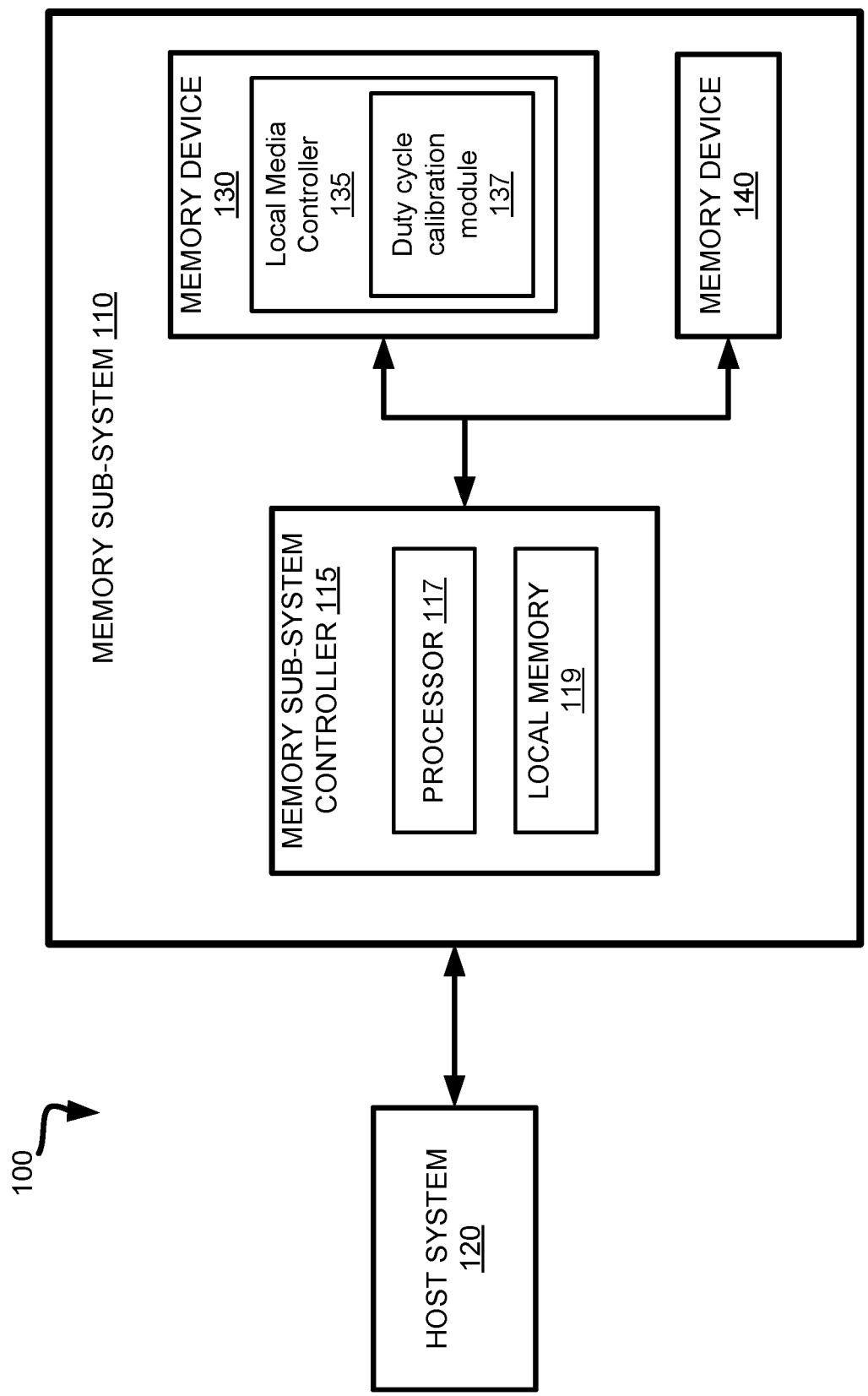
FIG. 1A illustrates an example computing system that includes a memory sub-system, in accordance with one or more embodiments of the present disclosure.

Aspects of the present disclosure are directed to managing an adjustment of a write duty cycle associated with one or more memory devices in a memory sub-system. A memory sub-system can be a storage device, a memory module, or a combination of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1A. A non-volatile memory device is a package of one or more dies. Each die can include one or more planes. For some types of non-volatile memory devices (e.g., NAND devices), each plane includes a set of physical blocks. Each block includes a set of pages. Each page includes a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

A memory device can be made up of bits arranged in a two-dimensional grid or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells.

Clock signals are used to coordinate actions of electrical circuits in electrical circuit devices, such as memory devices. The duty cycle of a clock signal is a ratio of the pulse time of the clock signal to its cycle period. The memory sub-system can include settings that enable the memory controller to change the shapes of periodic signals generated by the memory controller (e.g., write strobe signal) and the shapes of periodic signals generated by the memory device (e.g., read strobe signal). The settings discussed above can be specific to the memory sub-system controller and enable the memory controller to change how periodic signals are logically interpreted or to delay the periodic signals (e.g., phase shift). In one example, the settings can change the shape of a signal received by the memory device or generated by the memory device by changing the duty cycle of the signal. The duty cycle is a property of a signal and can indicate the relationship between durations of the signal that are high and durations of the signal that are low (e.g., ratio between active and inactive portions of the signal). For example, a write duty cycle is a property of a write or program strobe signal that represents a relationship or ratio between durations of the write probe signal that are high and durations of the write probe signal that are low.

Accordingly, the write duty cycle of a clock signal can become distorted due to a variety of sources, including amplifiers that make up a clock tree, large propagation distances between amplifier stages of the clock tree, and/or parasitic conductor capacitance. Distortion of the duty cycle skews timing margins defined by the clock signal in electrical circuit devices. As a result, an electrical circuit using the distorted clock signal can have smaller timing windows in which to transfer and/or process data, which could lead to reduced pulse widths, data errors, and unreliable circuit performance. As input/output (I/O) interface speeds increase (e.g., as the cycles of a clock signal are reduced), the setup time (tDS) and hold time (tDH) margins associated with the memory device pins during a data burst (i.e., when the memory sub-system controller is writing data into the memory device) become increasingly tighter due to the intrinsic data input buffer duty cycle distortion. For example, as the speed of the interface increases, the cycle time decreases and the setup and hold time margin decreases.

Distortion in the duty cycle of the data bus input (i.e., DQ and DQS interface pins) to the memory device (e.g., input buffer duty cycle distortion) can cause undesirable increases in the tDS/tDH margin due to delays in the rising or falling clock that require different skews that are dependent on the data polarity (e.g., 0 or 1). Accordingly, it is desirable to improve the DQ duty cycle such that the tDS/tDH margin is approximately 50%.

Calibration to correct duty cycle distortion that comes from the memory sub-system controller (e.g., the input signal or DQ duty cycle). An example duty cycle calibration technique is the write duty cycle adjustment (WDCA) calibration process that is fully controlled by memory sub-system controller. In this approach, the memory device only provides a way to digitally-control the duty cycle of the data bus (i.e., the DQ and DQS pins). The memory sub-system controller can run data input and data output sequences to sweep these streams and identify an optimal calibration setting. Disadvantageously, these calibration loop involve both the memory sub-system controller and the memory device and are slow and inefficient.

In addition, electrical circuits at different locations (e.g., on different electrical circuit dies or memory dies) can experience varying degrees of duty cycle distortion of a clock signal due to differing sources of distortion located along the corresponding clock branches of a clock tree that define the clock signal pathways.

In addition, many electrical circuit devices utilize multi-branch data paths including multiple parallel signal paths from a common source to a common destination. Although each parallel signal path may be formed with identical circuitry (i.e., having the same schematic and layout), processing variations introduced during the manufacturing of the components that form the parallel signal paths can lead to differences in the degrees of duty cycle distortion associated with each signal path.

Certain systems employ a calibration to attempt to correct the data input buffer duty cycle distortion. For example, one calibration method that is used is the write duty cycle adjustment (WDCA). This approach involves the use of a training sequence that is performed by the memory sub-system controller either at the initialization stage or in the factory to increase the tDS/tDH margins. However, the WDCA calibration is very slow due to the performance of the processing loop within the controller (i.e., at the memory sub-system level). This time-consuming firmware-based approach has a long processing loop and requires significant channel overhead which limits the ability to effectively reduce write duty cycle distortion, particularly at high input/output speeds. Furthermore, the WDCA calibration is performed repeatedly serially for each memory device (i.e., each NAND device) in the system.

Aspects of the present disclosure address the above and other deficiencies by performing an automatic write duty cycle adjustment with a calibration loop that is performed within the memory device (e.g., within the NAND device). In an embodiment, a hardware-based duty cycle adjustment is performed for each memory device in the system. A command is issued by the memory sub-system controller to initiate calibration of a write duty cycle associated with one or more input digital signals associated with a memory access operation (e.g., a write operation) corresponding to a memory device. According to embodiments, the duty cycle calibration process is performed by one or more components of the memory device. In response to the command from the memory sub-system controller, internally to the memory device, the calibration process is initiated with respect to one or more input digital signals (e.g., $DQ_0$, $DQ_1$, $DQ_2$ . . . $DQ_{N-1}$, DQS, DQSn) of the memory device. The calibration process enables an identification of a command or code (also referred to as a "duty cycle adjustment command") that is used to control or calibrate the duty cycle of the one or more input digital signals. In an embodiment, a voltage level is identified for each input digital signal subject to the duty cycle calibration. The voltage level of the input signal is compared to a reference voltage level to determine a comparison result. Based on the comparison result, a duty cycle calibration module (e.g., a state machine) identifies a command or digital code (also referred to as a "duty cycle adjustment command") that is used to control an adjustment of the duty cycle associated with the selected input digital signal. In an embodiment, the duty cycle calibration module identifies the duty cycle adjustment command of a set of duty cycle adjustment commands to be applied to the input digital signal being calibrated. In an embodiment, the duty cycle adjustment command is provide by the duty cycle calibration module to a module or circuit of an input receiver of the memory device (also referred to as a "duty cycle adjustment component"). Based on the duty cycle adjustment command, the duty cycle adjustment component corresponding to the input data signal being adjusted adjusts, modifies, or changes a timing of the selected input digital signal. In an embodiment, the adjustment made to the timing of the input digital signal can cause an increase of a width of a high pulse of the selected input digital signal or a decrease the width of the high pulse of the selected input digital signal in order to adjust the duty cycle of the signal to a desired or target level. In an embodiment, the input digital signal can be iteratively adjusted using the calibration process (e.g., subject to one or more calibration loop) until the duty cycle associated with the input digital signal reaches the target level (e.g., where a width of a high pulse of the input digital signal is equal to or substantially equal to a width of a low pulse of the input digital signal). In an embodiment, once the calibration processing or sequence is completed, one or more internal trim values associated with the duty cycle of the selected input digital signal can be updated by the duty cycle calibration module of the respective memory device.

Advantageously, the calibration process of the present application can be performed on each respective memory device to calibrate a write duty cycle of each input digital signals corresponding to a write operation being performed on the memory device. Furthermore, the calibration process can be controlled by one or more hardware components of the memory device to improve the speed and efficiency (e.g., use of less channel overhead) of the write duty cycle calibration.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., one or more memory device(s) 130), or a combination of such media or memory devices. The memory sub-system 110 can be a storage device, a memory module, or a hybrid of a storage device and memory module.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The memory device(s) 130 can be non-volatile memory device(s). One example of non-volatile memory devices is a not-and (NAND) memory device. A non-volatile memory device is a package of one or more dice or logic units (LUNs). Thus, each memory device 130 can be a die (or LUN) or can be a multi-dice package that includes multiple dice (or LUNs) on a chip, e.g., an integrated circuit package of memory dies. Each memory die can include one or more planes. For some types of non-volatile memory devices (e.g., NAND devices), each plane includes a set of physical blocks. Each block includes a set of pages. Each page includes a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., the one or more memory devices 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory device(s) 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory device(s) 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device(s) 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory device(s) 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115) can externally manage the memory device(s) 130 (e.g., perform media management operations on the memory device(s) 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The local media controller 135 can include control logic relating to the calibration of the write duty cycle of one or more input digital signals, referred to as a duty cycle calibration module 137. The duty cycle calibration module 137 can receive information relating to a selected input digital signal associated with a memory access operation (e.g., a write operation) being performed on the memory device(s) 130. The selected input digital signal can be received by a corresponding input receiver in the input transmission path. The input data signal can be sent to a multiplexer configured to enable the selection of the input digital signal for calibration processing by the duty cycle calibration module 137. The selected input digital signal can be provided by the multiplexer to a circuit configured translate the digital signal into a voltage level. In an embodiment, the circuit can include a low pass filter that receives the digital signal and outputs a corresponding voltage level. A comparator circuit (also referred to as a "comparator") can compare the voltage level of the selected input signal to a reference voltage to generate a comparison result. The comparison result can indicate whether the voltage level of the input signal is greater than, less than, or at least substantially equal to the reference voltage level, which indicates a write duty cycle level of the signal. In an embodiment, the comparison result is used by the duty cycle calibration module 137 to determine that distortion is present such that the write duty cycle is not a target range (e.g., the write duty cycle is not within an acceptable range or tolerance of 50%). For example, the distortion may cause a mismatch between a width of a high pulse of the input digital signal and a width of the low pulse of the input digital signal as represented by the comparison result. In an embodiment, an target write duty cycle range is identified when the width of the high pulse of the input signal is equal to or substantially equal to (i.e., within a defined range or tolerance) the width of the low pulse of the input signal. The duty cycle calibration module 137 uses the comparison result and identifies a duty cycle adjustment code based on the comparison result. The identified duty cycle adjustment code is selected and used to control the timing of the input data signal to adjust the write duty cycle of the input signal to a level within the target range (e.g., a target write duty cycle of approximately 50%).

The identified duty cycle adjustment code is provided by the duty cycle calibration module 137 to a duty cycle adjustment component associated with the selected input digital signal. In an embodiment, the duty cycle adjustment component is a circuit of the input receiver of the memory device that controls the timing of the selected input digital signal based on the duty cycle adjustment code. In an embodiment, the duty cycle adjustment component can be a two-stage circuit controlled by the duty cycle adjustment code. In an embodiment, each of the input digital signals can be associated with a respective duty cycle adjustment component that controls the timing and write duty adjustment for that input digital signal.

One or more calibration loops of the duty cycle calibration process can be performed until the duty cycle associated with the selected input digital signal is within the target duty cycle range (e.g., approximately 50%). In an embodiment, in each calibration loop, the duty cycle calibration module 137 can receive an updated comparison result based on a comparison of the adjusted voltage level corresponding to the selected input digital signal and the reference voltage. For each updated comparison result, the duty cycle calibration module 137 can identify an appropriate duty cycle adjustment code to be used to adjust the timing of the input digital signal to calibrate the write duty cycle. In an embodiment, during a busy time associated with the memory device, the duty cycle calibration module 137 can update the one or more duty cycle adjustment commands or codes associated with the one or more selected input digital signals that were calibrated.

In an embodiment, the duty cycle adjustment command or code used to calibrate the write duty cycle of an input digital signal (e.g., the calibration results) can be updated or stored in a ROM memory location associated with the write duty calibration of the respective input digital signal. In an embodiment, the duty cycle adjustment command that is stored in the ROM memory location can be replaced or overwritten following execution of subsequent calibration processing. Further details regarding implementing the memory device-based (i.e., internal) write duty cycle calibration are described below with reference to FIGS. 3-7.

Figure 1B:
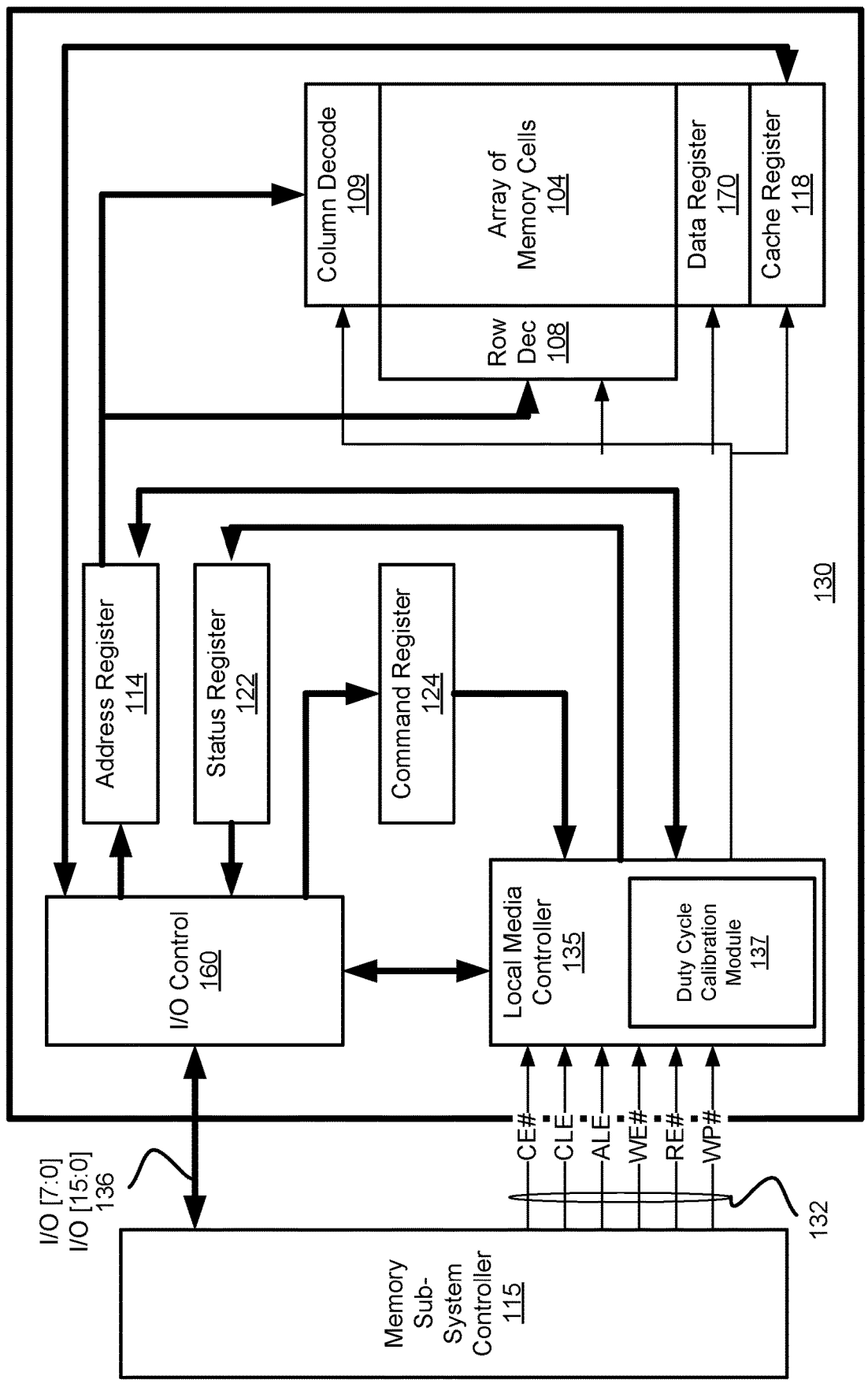
FIG. 1B is a block diagram of memory device(s) in communication with a memory sub-system controller of a memory sub-system according to an embodiment.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device(s) 130 includes an array of memory cells 104 logically arranged in rows and columns. Memory cells of a logical row are connected to the same access line (e.g., a wordline) while memory cells of a logical column are selectively connected to the same data line (e.g., a bitline). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device(s) 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses. In one embodiment, local media controller 135 includes the duty cycle calibration module 137 which is configured to receive commands from the memory sub-system controller 115 to initiate and execute write duty cycle calibration with respect to one or more input digital signals associated with a memory access operation performed on one or more of memory device(s) 130.

The local media controller 135 is also in communication with a cache register 118. Cache register 118 latches data, either incoming or outgoing, as directed by the local media controller 135 to temporarily store data while the array of memory cells 104 is busy writing or reading, respectively, other data. During a program operation (e.g., write operation), data may be passed from the cache register 118 to the data register 170 for transfer to the array of memory cells 104; then new data may be latched in the cache register 118 from the I/O control circuitry 160. During a read operation, data may be passed from the cache register 118 to the I/O control circuitry 160 for output to the memory sub-system controller 115; then new data may be passed from the data register 170 to the cache register 118. The cache register 118 and/or the data register 170 may form (e.g., may form a portion of) a page buffer of the memory device 130. A page buffer may further include sensing devices (not shown in FIG. 1B) to sense a data state of a memory cell of the array of memory cells 204, e.g., by sensing a state of a data line connected to that memory cell. A status register 122 may be in communication with I/O control circuitry 160 and the local memory controller 135 to latch the status information for output to the memory sub-system controller 115.

Memory device(s) 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 160 and may then be written into command register 124. The addresses may be received over input/output (I/O) pins [7:0] of I/O bus 136 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 118. The data may be subsequently written into data register 170 for programming the array of memory cells 104.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIGS. 1A-1B has been simplified. It should be recognized that the functionality of the various block components described with reference to FIGS. 1A-1B may not necessarily be segregated to distinct components or component portions of an integrated circuit device. For example, a single component or component portion of an integrated circuit device could be adapted to perform the functionality of more than one block component of FIGS. 1A-1B. Alternatively, one or more components or component portions of an integrated circuit device could be combined to perform the functionality of a single block component of FIGS. 1A-1B. Additionally, while specific I/O pins are described in accordance with popular conventions for receipt and output of the various signals, it is noted that other combinations or numbers of I/O pins (or other I/O node structures) may be used in the various embodiments.

Figure 2A:
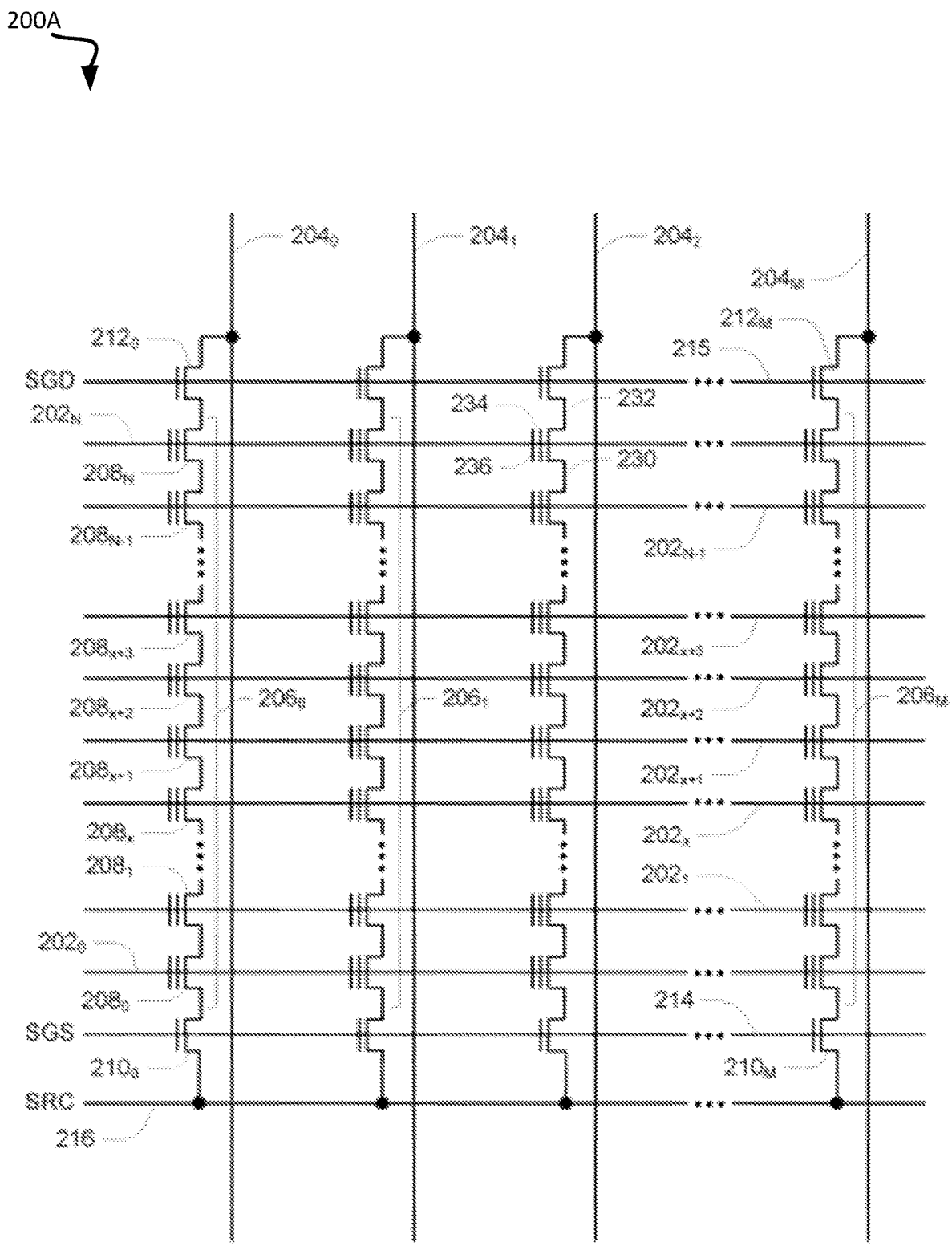
FIGS. 2A-2C are diagrams of portions of an example array of memory cells included in a memory device, in accordance with some embodiments of the present disclosure.
Figure 2B:
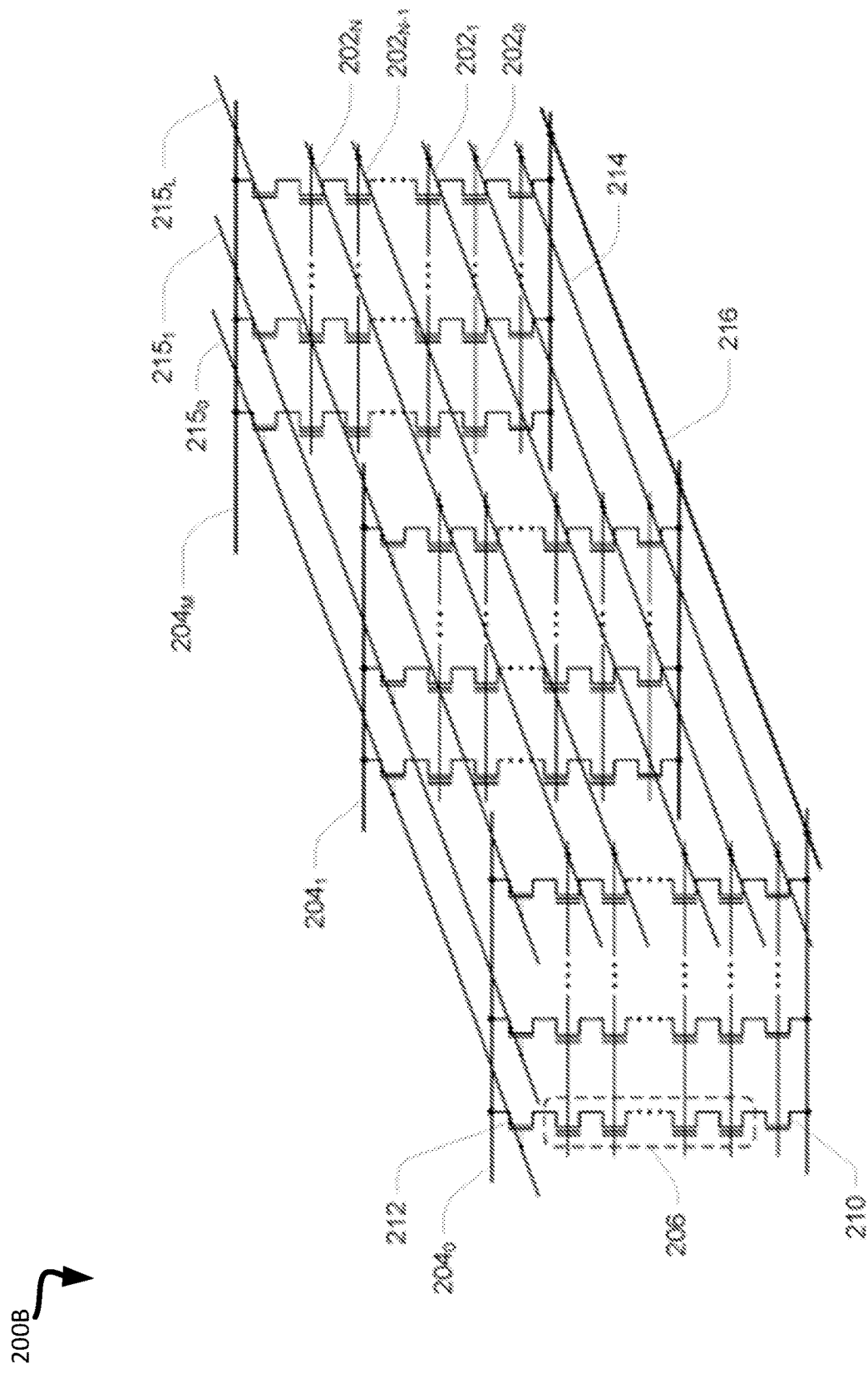
Figure 2C:
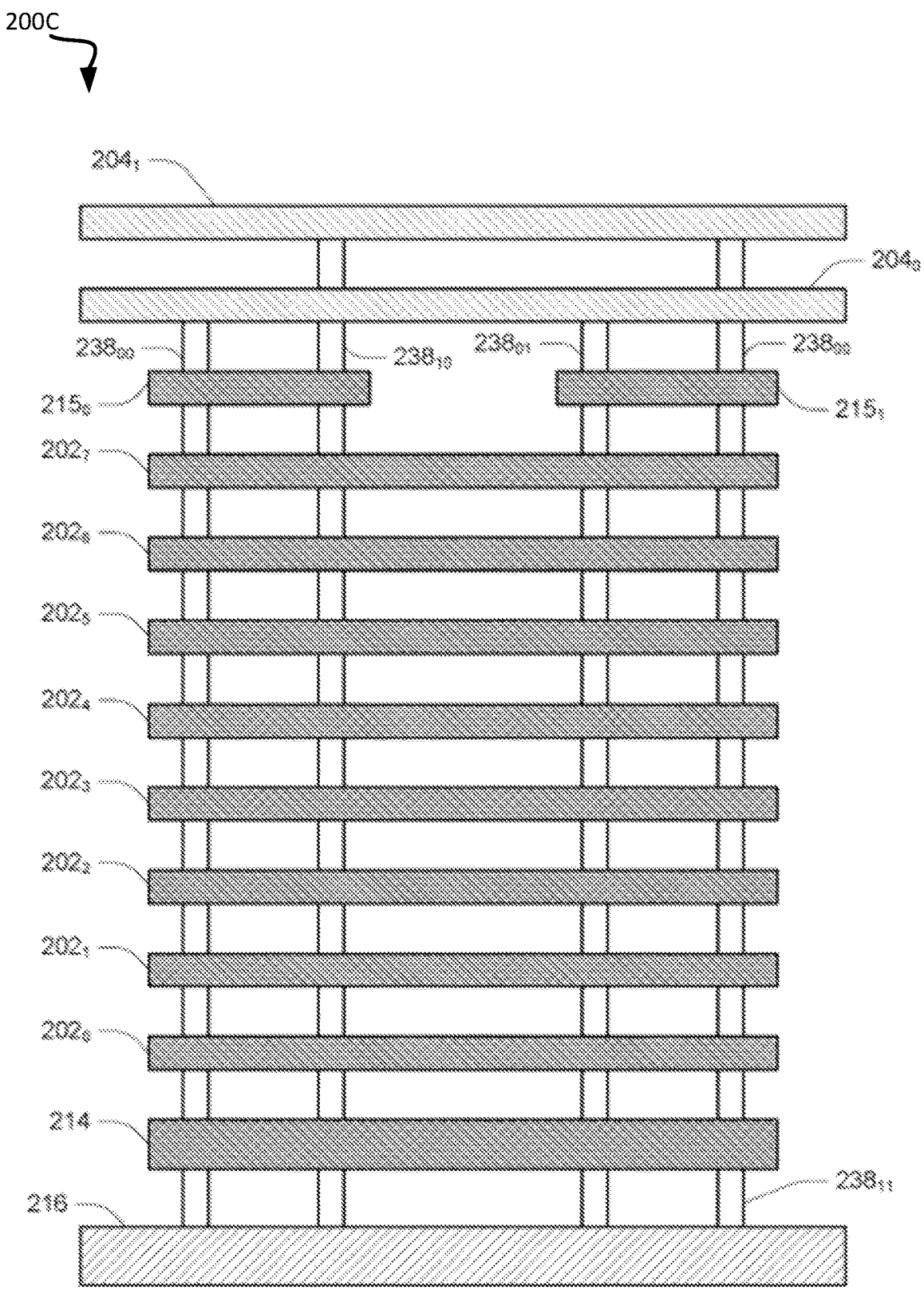

FIGS. 2A-2C are diagrams of portions of an example array of memory cells included in a memory device, in accordance with some embodiments of the present disclosure. For example, FIG. 2A is a schematic of a portion of an array of memory cells 200A as could be used in a memory device (e.g., as a portion of array of memory cells 104). Memory array 200A includes access lines, such as wordlines $202_0$ to $202_N$, and a data line, such as bitline 204. The wordlines 202 may be connected to global access lines (e.g., global wordlines), not shown in FIG. 2A, in a many-to-one relationship. For some embodiments, memory array 200A may be formed over a semiconductor that, for example, may be conductively doped to have a conductivity type, such as a p-type conductivity, e.g., to form a p-well, or an n-type conductivity, e.g., to form an n-well.

Memory array 200A can be arranged in rows each corresponding to a respective wordline 202 and columns each corresponding to a respective bitline 204. Rows of memory cells 208 can be divided into one or more groups of physical pages of memory cells 208, and physical pages of memory cells 208 can include every other memory cell 208 commonly connected to a given wordline 202. For example, memory cells 208 commonly connected to wordline $202_N$ and selectively connected to even bitlines 204 (e.g., bitlines $204_0$, $204_2$, $204_4$, etc.) may be one physical page of memory cells 208 (e.g., even memory cells) while memory cells 208 commonly connected to wordline $202_N$ and selectively connected to odd bitlines 204 (e.g., bitlines $204_1$, $204_3$, $204_5$, etc.) may be another physical page of memory cells 208 (e.g., odd memory cells). Although bitlines $204_3$-$204_5$ are not explicitly depicted in FIG. 2A, it is apparent from the figure that the bitlines 204 of the array of memory cells 200A may be numbered consecutively from bitline $204_0$ to bitline $204_M$. Other groupings of memory cells 208 commonly connected to a given wordline 202 may also define a physical page of memory cells 208. For certain memory devices, all memory cells commonly connected to a given wordline might be deemed a physical page of memory cells. The portion of a physical page of memory cells (which, in some embodiments, could still be the entire row) that is read during a single read operation or programmed during a single programming operation (e.g., an upper or lower page of memory cells) might be deemed a logical page of memory cells. A block of memory cells may include those memory cells that are configured to be erased together, such as all memory cells connected to wordlines $202_0$-$202_N$ (e.g., all strings 206 sharing common wordlines 202). Unless expressly distinguished, a reference to a page of memory cells herein refers to the memory cells of a logical page of memory cells.

Each column can include a string of series-connected memory cells (e.g., non-volatile memory cells), such as one of strings $206_0$ to $206_M$. Each string 206 can be connected (e.g., selectively connected) to a source line 216 (SRC) and can include memory cells $208_0$ to $208_N$. The memory cells 208 of each string 206 can be connected in series between a select gate 210, such as one of the select gates $210_0$ to $210_M$, and a select gate 212, such as one of the select gates $212_0$ to $212_M$. In some embodiments, the select gates $210_0$ to $210_M$ are source-side select gates (SGS) and the select gates $212_0$ to $212_M$ are drain-side select gates. Select gates $210_0$ to $210_M$ can be connected to a select line 214 (e.g., source-side select line) and select gates $212_0$ to $212_M$ can be connected to a select line 215 (e.g., drain-side select line). The select gates 210 and 212 might represent a plurality of select gates connected in series, with each select gate in series configured to receive a same or independent control signal. A source of each select gate 210 can be connected to SRC 216, and a drain of each select gate 210 can be connected to a memory cell $208_0$ of the corresponding string 206. Therefore, each select gate 210 can be configured to selectively connect a corresponding string 206 to SRC 216. A control gate of each select gate 210 can be connected to select line 214. The drain of each select gate 212 can be connected to the bitline 204 for the corresponding string 206. The source of each select gate 212 can be connected to a memory cell $208_N$ of the corresponding string 206. Therefore, each select gate 212 might be configured to selectively connect a corresponding string 206 to the bitline 204. A control gate of each select gate 212 can be connected to select line 215.

In some embodiments, and as will be described in further detail below with reference to FIG. 2B, the memory array in FIG. 2A is a three-dimensional memory array, in which the strings 206 extend substantially perpendicular to a plane containing SRC 216 and to a plane containing a plurality of bitlines 204 that can be substantially parallel to the plane containing SRC 216.

FIG. 2B is another schematic of a portion of an array of memory cells 200B (e.g., a portion of the array of memory cells 104) arranged in a three-dimensional memory array structure. The three-dimensional memory array 200B may incorporate vertical structures which may include semiconductor pillars where a portion of a pillar may act as a channel region of the memory cells of strings 206. The strings 206 may be each selectively connected to a bit line $204_0$-$204_M$ by a select gate 212 and to the SRC 216 by a select gate 210. Multiple strings 206 can be selectively connected to the same bitline 204. Subsets of strings 206 can be connected to their respective bitlines 204 by biasing the select lines $215_0$-$215_L$ to selectively activate particular select gates 212 each between a string 206 and a bitline 204. The select gates 210 can be activated by biasing the select line 214. Each wordline 202 may be connected to multiple rows of memory cells of the memory array 200B. Rows of memory cells that are commonly connected to each other by a particular wordline 202 may collectively be referred to as tiers.

FIG. 2C is a diagram of a portion of an array of memory cells 200C (e.g., a portion of the array of memory cells 104). Channel regions (e.g., semiconductor pillars) $238_{00}$ and $238_{01}$ represent the channel regions of different strings of series-connected memory cells (e.g., strings 206 of FIGS. 2A-2B) selectively connected to the bitline $204_0$. Similarly, channel regions $238_{10}$ and $238_{11}$ represent the channel regions of different strings of series-connected memory cells (e.g., NAND strings 206 of FIGS. 2A-2B) selectively connected to the bitline $204_1$. A memory cell (not depicted in FIG. 2C) may be formed at each intersection of an wordline 202 and a channel region 238, and the memory cells corresponding to a single channel region 238 may collectively form a string of series-connected memory cells (e.g., a string 206 of FIGS. 2A-2B). Additional features might be common in such structures, such as dummy wordlines, segmented channel regions with interposed conductive regions, etc.

Figure 3:
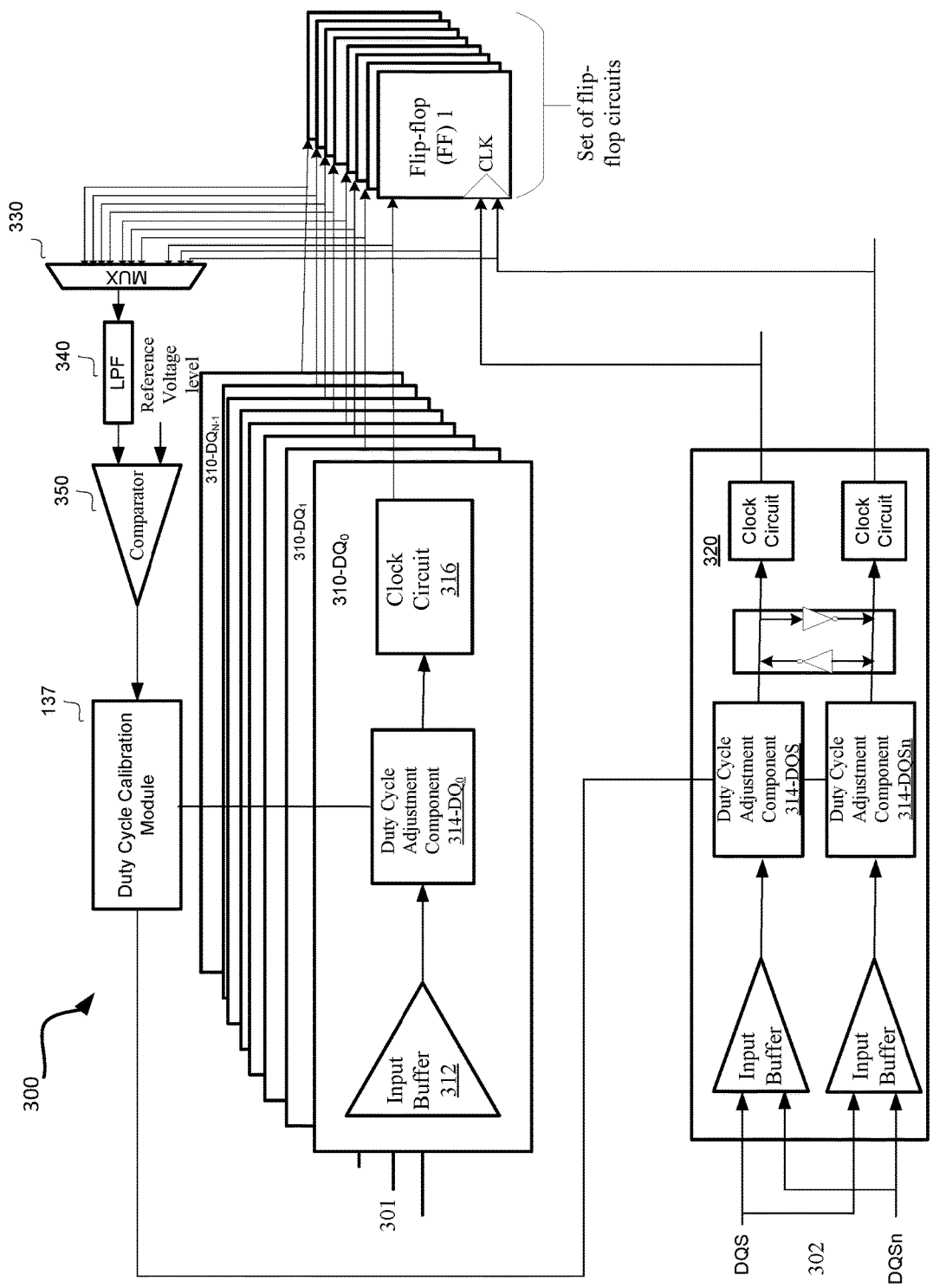
FIG. 3 is a block diagram of an example implementation of a duty cycle calibration system associated with one or more memory devices, in accordance with one or more embodiments of the present disclosure.

FIG. 3 is a block diagram of an example implementation of a write duty cycle calibration system 300 of a memory device, in accordance with one or more embodiments of the present disclosure. In an embodiment, the write duty calibration system 300 includes a set of first input receivers 310 including a first input receiver 310 for each data input signal of the a first set of data inputs (e.g., the DQ input set) 301 and a set of second input receivers 320 for a second set of data inputs (e.g., the DQS input set) 302. In an embodiment, each input receiver (e.g., 310-$DQ_0$) of the first set of first input receivers includes an input buffer 312 a duty cycle adjustment component (e.g., 314-$DQ_0$) and a clock circuit 316. For example, a first input digital signal (e.g., $DQ_0$) of the first set of input signals 301 can be processed by a first input receiver 310-$DQ_0$ including a first duty cycle adjustment component 314-$DQ_0$, a second input digital signal (e.g., $DQ_1$) of the first set of input signals 301 can be processed by a second input receiver 310-$DQ_1$ including a second duty cycle adjustment component . . . and a N-1 input digital signal (e.g., $DQ_{N-1}$; where N=a number of data bus signals (DQ)) of the first set of input signals 301 can be processed by an N-1 input receiver 310-$DQ_{N-1}$), as shown in the example of FIG. 3.

In an embodiment, to determine if the duty cycle is to be adjusted to satisfy a desired or target tDS/tDH (e.g., calibrate the duty cycle to be within a target range) at the set of flip-flop circuits 325, the sets of digital signals (e.g., DQ and DQS signal sets) are fed back through components of the write duty cycle calibration system 300 including a multiplexer (MUX) 330 that feeds a low pass filter 340, as shown in FIG. 3. The low pass filter 340 translates each of the digital signals (e.g., $DQ_0$, $DQ_1$, $DQ_2$ . . . $DQ_{N-1}$, DQS and $DQS_n$; where N=a number of data bus signals (DQ)) to a corresponding analog voltage level (e.g., $V_{lpfdq0}$, $V_{lpfdq1}$, $V_{lpfdq2}$ . . . $Vlpfsdq_{N-1}$; where $V_{lpfdq0}$ is the output of the low pass filter 340 corresponding to $DQ_0$, $V_{lpfdq1}$ is the output of the low pass filter 340 corresponding to $DQ_1$ . . . , $V_{lpfdqN-1}$ is the output of the low pass filter 340 corresponding to $DQ_{N-1}$, $V_{lpfdqs}$ is the output of the low pass filter 340 corresponding to DQS and $V_{lpfdqsn}$ is the output of the low pass filter 340 corresponding to DQSn).

The analog voltage level corresponding to each data input signal is compared to a reference voltage level (i.e., Vref) by a comparator circuit 350. The output of the comparator circuit 350 (i.e., the comparison result) can be used to measure a duty cycle associated with each corresponding input signal. In an embodiment, the reference voltage level may be established based on a voltage of a power supply (Vps) and set to a level to reduce the distortion, and achieve a target duty cycle and tDS/tDH margin level. For example, the reference voltage may be set to one half of the Vps (i.e., Vps/2) or other suitable voltage level for use in comparison with the output of the low pass filter 340.

In an embodiment, a duty cycle calibration module 137 uses the data comparing the sensed analog voltage at the output of the low pass filter and the comparison of that analog voltage to the reference voltage to determine a duty cycle adjustment command corresponding to an adjustment of one or more trim values to adjust the write duty cycle associated with a respective data input signal. In an embodiment, based on the comparison, the duty cycle calibration module 137 can use the comparison result received from the comparator 350 and identify a duty cycle calibration code to control the adjustment of the write duty cycle. In an embodiment, the duty cycle adjustment component (e.g., 314-$DQ_0$) receives the duty cycle calibration command or instruction to makes adjustments to the trim values to adjust the duty cycle, feedback the adjusted digital signals, convert the adjusted digital signals to analog voltage values, and compare the analog voltage values to the reference voltage until the analog voltage value is substantially equal to the reference voltage (e.g., equal to or within a threshold or tolerance of the reference voltage), indicating a target duty cycle level has been reached).

In an embodiment, for an optimal target duty cycle (i.e., no distortion), the output voltage of the low pass filter 340 corresponding to a data input (e.g., $V_{lpf0}$) is substantially equal to the reference voltage level (e.g., the output voltage of the low pass filter 340 and the reference voltage level substantially match one another and are approximately one half of a power supply voltage (Vps) or Vps/2). In this example, the duty cycle calibration module 137 can determine that there is little to no distortion present in the system since the output voltage of the low pass filter 340 is at least substantially equal to the reference voltage level (e.g., the two voltages are equal or within a threshold range such as 0.1V, 0.2V, 0.3V, etc.). Accordingly, the duty cycle calibration module 137 determines that no adjustment to the duty cycle for that input signal (e.g., $DQ_0$) is needed.

Figure 4A:
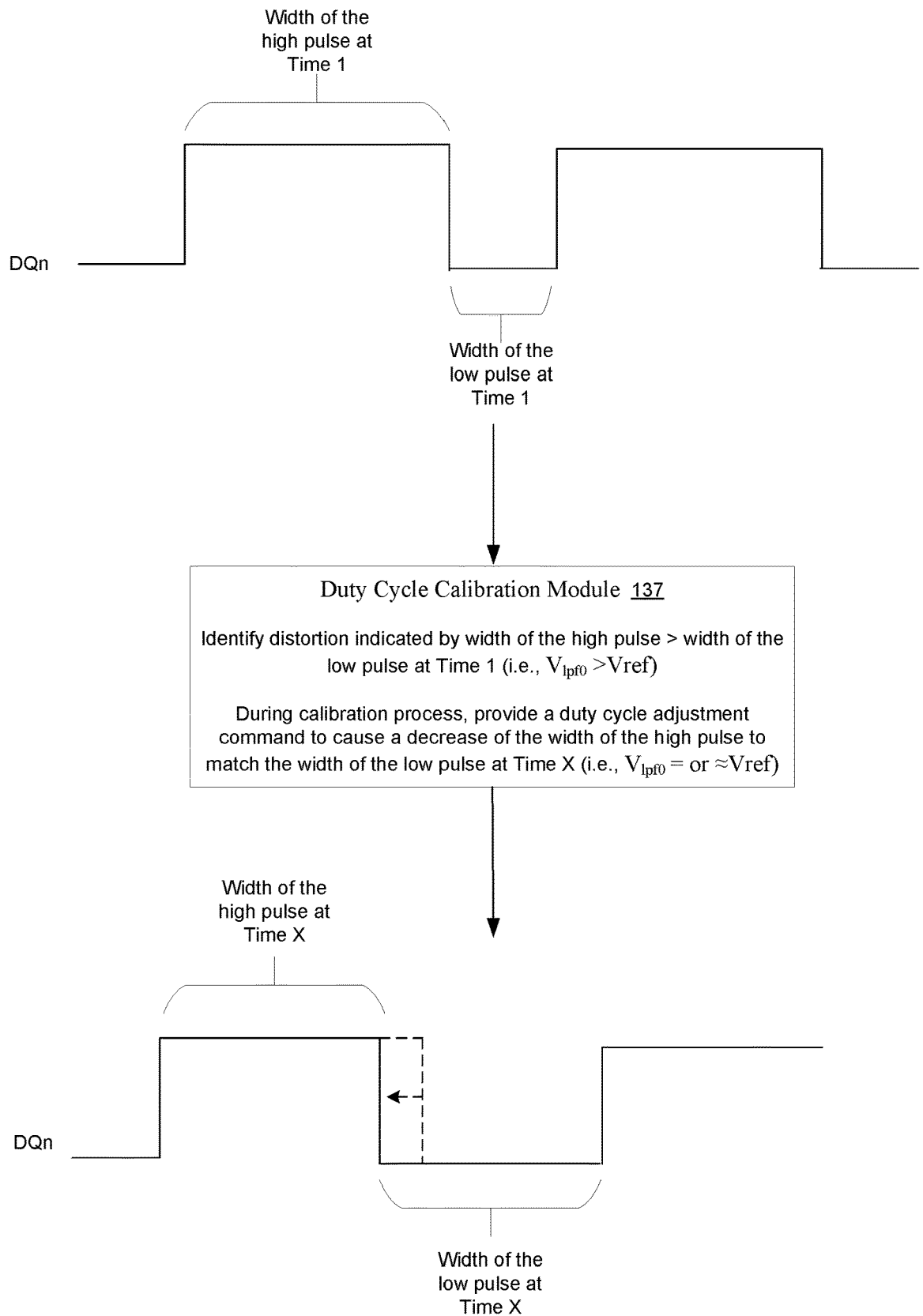
FIG. 4A illustrates an example duty cycle calibration processing where a comparison result indicates that a voltage level of a digital signal is above or greater than a reference voltage level, in accordance with one or more embodiments of the present disclosure.

FIG. 4A illustrates an example duty cycle calibration processing where the comparison result generated by the comparator 350 indicates that, at a first time (e.g., Time 1), the voltage at the output of the low pass filter 340 is above or greater than the reference voltage level (i.e., $V_{lpf0}$>Vref). In this example, as shown in FIG. 4A, in response to this comparison result indicating there is distortion in the system, the duty cycle calibration module 137 generates a command to adjust one or more trim values during one or more calibration loops to decrease the width of the high pulse to at least substantially match the width of the low pulse, as denoted by the dashed lines in FIG. 4A. In an embodiment, following one or more calibration loops and adjustments of the one or more trim values, at time X, the duty cycle calibration module 137 and duty cycle adjustment component establish or set the output of the low pass filter corresponding to the digital input signal (e.g., $DQ_0$) to equal or substantially equal the reference voltage level (i.e., $V_{lpf0}$=or ≈Vref). By matching the low pass filter voltage level and the reference voltage level for a data input signal, the write duty cycle is calibrated.

Figure 4B:
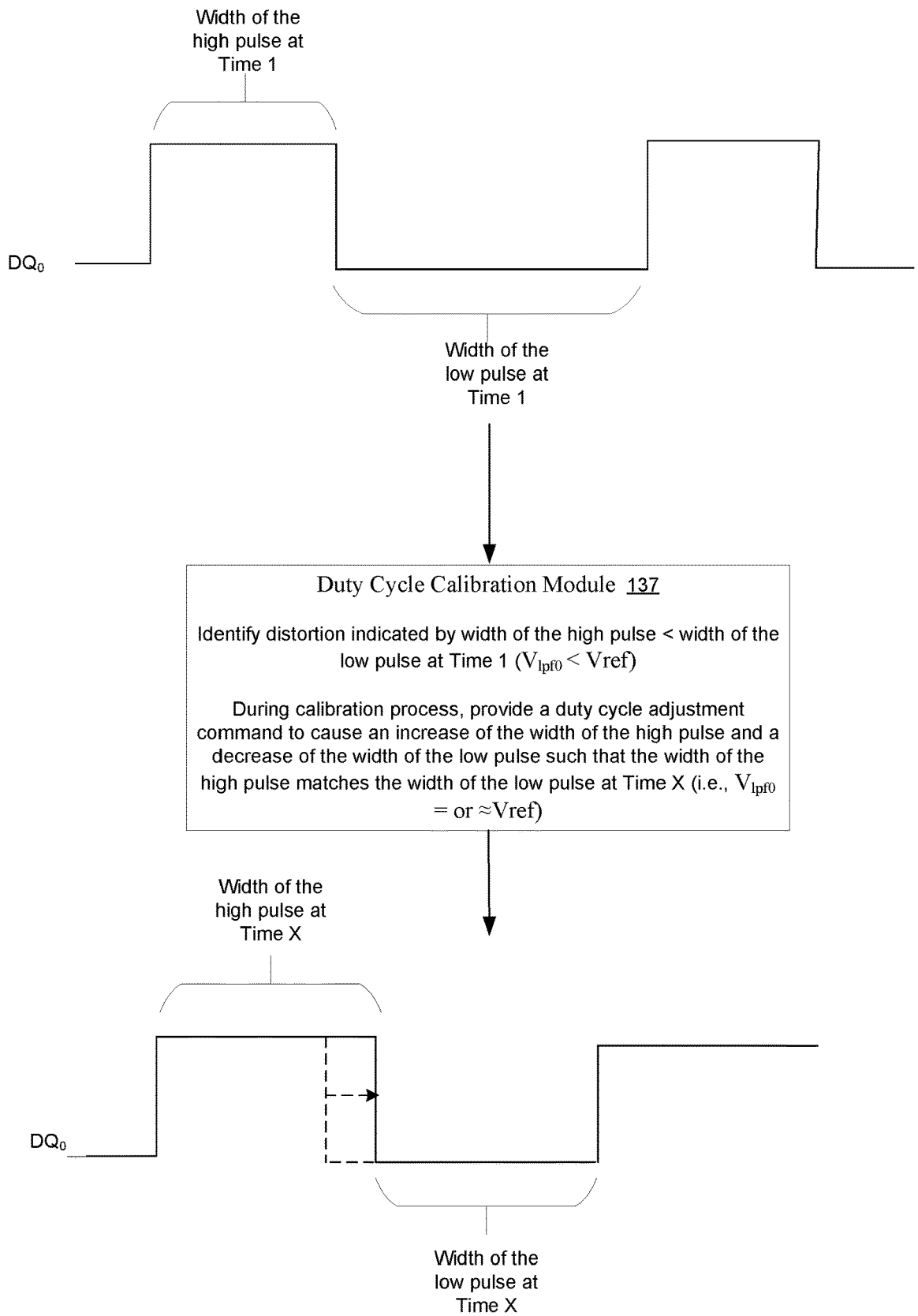
FIG. 4B illustrates an example duty cycle calibration processing where a comparison result indicates that a voltage level of a digital signal is below or less than a reference voltage level, in accordance with one or more embodiments of the present disclosure

FIG. 4B illustrates an example where the comparison result generated by the comparator 350 indicates that, at a first time (e.g., Time 1), the voltage at the output of the low pass filter 340 is below or less than the reference voltage level (i.e., $V_{lpf0}$<Vref). In this example, as shown in FIG. 4B, the duty cycle calibration module 137 identifies the distortion in the system impacting the write duty cycle and generates a command to adjust one or more trim values during one or more calibration loops to increase the width of the high pulse to at least substantially match the width of the low pulse, as indicated by the dashed lines in FIG. 4B. In an embodiment, following one or more calibration loops and adjustments of the one or more trim values, at Time X, the duty cycle calibration module 137 and duty cycle adjustment component establish or set the output of the low pass filter corresponding to the digital input signal (e.g., $DQ_0$) to equal or substantially equal the reference voltage level (i.e., $V_{lpf0}$=or ≈Vref). In this example, through the described calibration process, the low pass filter voltage level and the reference voltage level for each respective data input signal are matched by adjusting the one or more trim values, thereby calibrating the write duty cycle.

With reference to FIG. 3, in an embodiment, the results of the duty cycle calibration module 137 (e.g., a determination of an adjustment to the trim values) is provided as an input to the duty cycle adjustment component 314 corresponding to the data input signal (e.g., the DQ or DQS signal) that has a write duty cycle that is being adjusted. In an embodiment, the duty cycle calibration module 137 sends the duty cycle adjustment command (e.g., 4-bit digital code) to identify the type of adjustment that is to be made to the write duty cycle of the input digital signal by the duty cycle adjustment component 314. In an embodiment, the duty cycle adjustment component 314 receives the command or code from the duty cycle calibration module 350

In an embodiment, the duty cycle adjustment components 314 (e.g., circuits corresponding to the respective data input signals) can be controlled by firmware configured to read the duty cycle adjustment command (e.g., the digital code) received from the duty cycle calibration module 137 that is written into the selected duty cycle adjustment component circuit 314. In an embodiment, the duty cycle adjustment component 314 can be implemented as a hardware component configured to control the duty cycle of the input digital signal based on the duty cycle adjustment command. In an embodiment, the duty cycle calibration module 137 and the duty cycle adjustment component 314 are operatively coupled to enable the passage of the duty cycle adjustment command that is used by the duty cycle adjustment component 314 to calibrate the write duty cycle corresponding to a data input signal. In an embodiment, one or more calibration loops can be performed to identify one or more respective duty cycle adjustment commands used by the duty cycle adjustment component 314 to calibrate the write duty cycle level until it is within the target range (e.g., establish a write duty cycle of approximately 50%).

In an embodiment, based on a comparison of the output of the low pass filter corresponding to a data input signal (e.g., the translated voltage level corresponding to the digital input signal), the duty cycle calibration module 137 can generate instructions to either decrease a width of a high pulse of the corresponding digital input signal (e.g., as shown in FIG. 4A) or increase a width of a high pulse of the digital input signal (e.g., as shown in FIG. 4B) to reach a desired state where the width of the high pulse matches the width of the low pulse.

In an embodiment, each of the duty cycle adjustment components (e.g., 314-DQ0, 314-DQS, 314-DQSn) can include a circuit (e.g., a two-stage inverter) controlled in accordance with the duty cycle calibration command or digital code received from the duty cycle calibration module 137. In an embodiment, the duty cycle adjustment component 314 includes a set of logic gates that are either turned on or turned off in accordance with the command received from the duty cycle calibration module to adjust the duty cycle of the digital signal (e.g., increases the duty cycle or decreases the duty cycle of the respective data input signal as it passes through the input receiver 310, 320.

According to embodiments, each digital signal (e.g., each of the DQ and DQS signals) can be calibrated independently using the components of the write duty cycle calibration system 300. In an embodiment, each input digital signal (e.g., $DQ_0$ ... $DQ_{N-1}$, DQS, and DQSn) is associated with a duty cycle adjustment component that can receive a command or code from the duty cycle calibration module corresponding to a respective digital cycle and adjust the duty cycle for that digital signal in accordance with the command or code.

Figure 5:
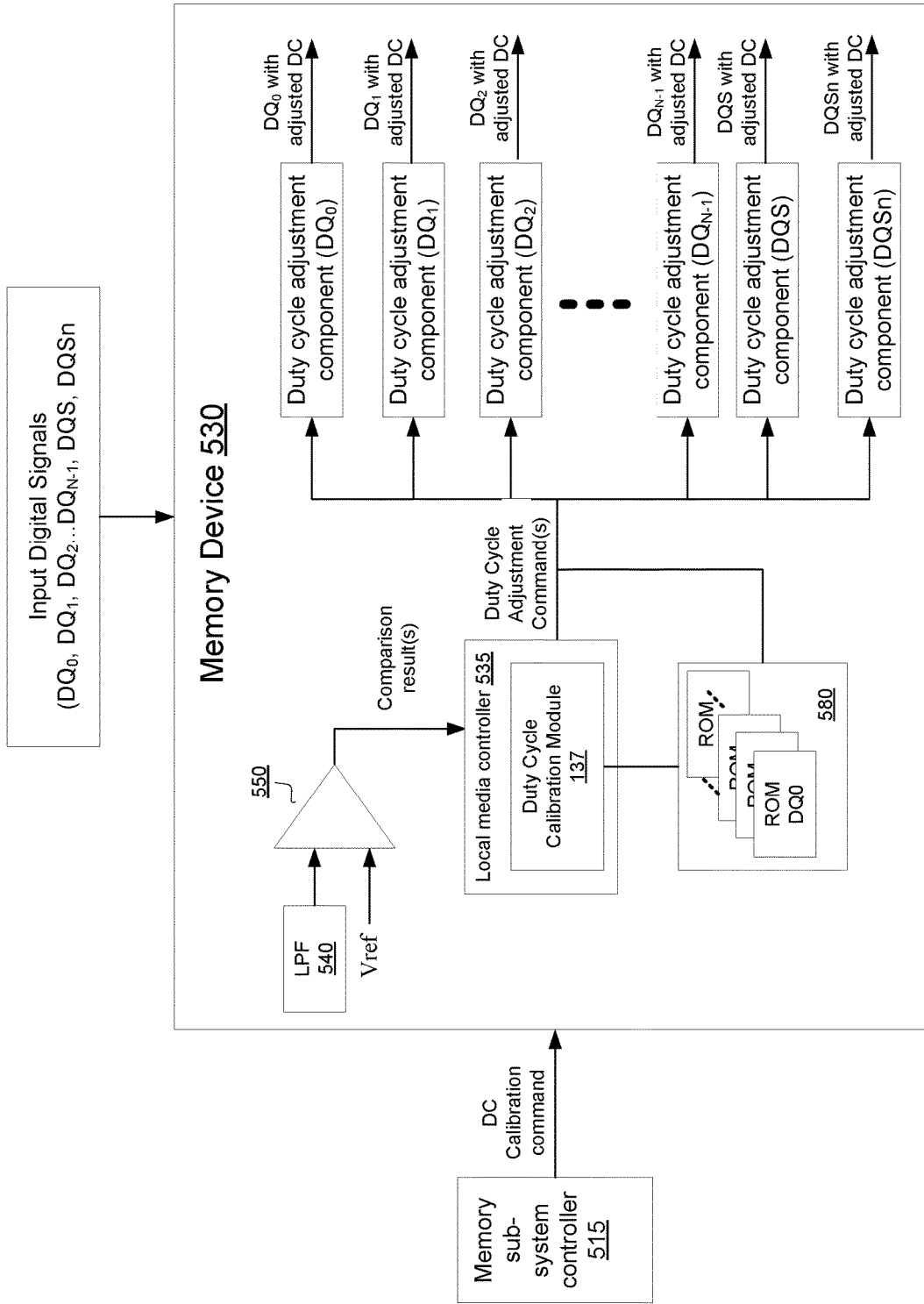
FIG. 5 illustrates an example memory device including a duty cycle calibration module operatively coupled to multiple duty cycle adjustment components to execute a duty cycle calibration process, in accordance with some embodiments of the present disclosure.

FIG. 5 illustrates an example memory device 530 including a duty cycle calibration module 137 operatively coupled to multiple duty cycle adjustment components to execute a duty cycle calibration process, according to embodiments of the present disclosure. In an embodiment, a memory sub-system controller 515 can control the execution of the duty cycle calibration process with respect to the memory device 530. For example, the memory sub-system controller 515 can issue a duty cycle calibration command (e.g., a command sequence) to the memory device 530 to enable execution of the calibration processing with respect to that memory device 530, according to embodiments of the present disclosure. In an embodiment, the memory sub-system controller can use a set of feature addresses that can be used to enable or disable the calibration feature for a respective input signal bit (e.g., $DQ_0$, $DQ_1$ ... $DQ_{N-1}$, DQS, and DQSn). In an embodiment, based on the value associated with the feature set address (e.g., "0" for disabled or "1" for enabled), the input digital signal that is under calibration is selected and determined. In an embodiment, memory sub-system controller 513 can select a particular input signal for calibration or execute calibration on a sequence of multiple input signals (e.g., execution of the calibration processing for $DQ_0$, followed by the execution of the calibration processing for $DQ_1$, and so on).

In an embodiment, following the sending of the duty cycle calibration command (e.g., the calibration enable command and an identification of the selected input digital signal to be calibrated), the memory sub-system controller 515 can issue a program or write command with a full page data load. In an embodiment, during the full page data load, the calibration processing is performed such that the duty cycle calibration module 137 issues the duty cycle adjustment command (e.g., a 4-bit digital code) to the duty cycle adjustment component corresponding to the selected input digital signal.

As shown in FIG. 5, a comparator circuit 550 generates a comparison result based on a comparison of a voltage level associated with the selected input digital signal (e.g., the output of the low pass filter 540) and a reference voltage level (Vref). The comparison result is used by the duty cycle calibration module 137 to identify a duty cycle adjustment command. In an embodiment, the duty cycle adjustment command can be represented by a 4-bit digital code. For example, in a first operation, the duty cycle calibration module 137 sets a most significant bit (MSB) of the digital code to "1", while the other bits are set to "0" (e.g., the digital code is [1000]). Based on the comparison result, the MSB is confirmed to be "1" if the comparison result indicates that $Vlpf_{DQ}<Vrefq$ or set to "0" if the comparison result indicates that $Vlpf_{DQ}>Vref$. In a second operation, the MSB is set to some value "X" based on the previous operation, and the second MSB is set to "1", while the other bits are still reset (e.g., the digital code is [X100]). Based on the comparison result, the second MSB is either confirmed to be "1" if the comparison result indicates that $Vlpf_{DQ}<Vrefq$ or set to "0" if the comparison result indicates that $Vlpf_{DQ}>Vref$.

In this example, in a third operation, the first two MSBs are set based on the previous operations, the third MSB is set to "1" and the other bit remains reset (e.g., the digital code is [XX10]). Based on the comparison result, the third MSB is either confirmed to be "1" if the comparison result indicates that $Vlpf_{DQ}<Vrefq$ or set to "0" if the comparison result indicates that $Vlpf_{DQ}>Vref$. In a fourth operation, all of the bits of the digital code are some to some value based on the previous steps, except for the least significant bit (LSB). In this operation, the LSB is set to "1" (e.g., the digital code is [XXX1]). Based on the comparison result, the LSB is either confirmed to be "1" if the comparison result indicates that $Vlpf_{DQ}<Vrefq$ or set to "0" if the comparison result indicates that $Vlpf_{DQ}>Vref$.

In an embodiment, the comparator circuit 550 implements a binary search algorithm in which, starting from a middle code (e.g., 1000), based on a comparator result, a decision is made if the most significant bit (MSB) should be 1 or 0. The MSB is then fixed and a next bit is forced to 1 and, again, based on a comparator result, a decision is made if the bit should be a 1 or a 0, and so on.

The duty cycle adjustment command is selected to control the operation of the corresponding duty cycle adjustment component to adjust the timing of the selected input data signal to calibrate the write duty cycle until it is within the target range (e.g., within a range of 48% and 52%). In an embodiment, the four bits are used to control the duty cycle adjustment component. In an embodiment, the duty cycle adjustment component modifies the duty cycle based on the value of the four bits. For example, a code 1000 can indicate no duty cycle change, codes higher than 1000 can indicate a reduction in the low pulse, and codes lower than 100 can indicate an increase in the low pulse.

In an embodiment, the duty cycle adjustment component controls the timing of the input digital signal based on the duty cycle adjustment command (e.g., one or more logic gates of the duty cycle adjustment component are turned on and/or turned off in accordance with the duty cycle adjustment command) and generates the corresponding input digital signal (e.g., $DQ_0$, $DQ_1$, $DQ_2$ . . . $DQ_{N-1}$, DQS, or DQSn) with an adjusted duty cycle. In an embodiment, the input digital signal with the adjusted duty cycle generated by the duty cycle adjustment component can be fed back to the low pass filter 540 as part of a next calibration loop. In the next calibration loop, the low pass filter can output a voltage level corresponding to the input digital signal with the adjusted duty cycle (e.g., an adjusted voltage level). The adjusted voltage level can be compared to the reference voltage level to determine an updated comparison result. The updated comparison result can be used by the duty cycle calibration module 137 to identify a corresponding duty cycle adjustment command to send to the duty cycle adjustment component to control a further adjustment of the write duty cycle of the input digital signal. Calibration loops of the calibration process can be performed iteratively until the write duty cycle of the selected input digital cycle is within the target range.

In an embodiment, the memory device can include a set of read only memory (ROM) modules 580 that each store a value of the duty cycle adjustment command or code to control a respective instance of the duty cycle adjustment component. In an embodiment, a local media controller 535 of the memory device 530 can read the one or more calibration results (e.g., the one or more duty cycle adjustment commands) generated by the duty cycle calibration module 137 and update or replace the one or more values stored in the corresponding ROM memory location for each respective input digital signal. In another embodiment, the duty cycle calibration module 137 can be configured (e.g., include hardware) to store the calibration results for all of the input digital signals in the duty cycle calibration module 137. In an embodiment, the duty cycle calibration module 137 can cause the calibration results to be stored in the ROM memory locations 580.

In an embodiment, the duty cycle calibration module 137 can use a multiplexer (not shown) to select the one or more input digital signals that are to be calibrated in view of the duty cycle calibration command received from the memory sub-system controller 515. As described above, the duty cycle calibration module 137 uses the comparison result(s) of the comparator 550 to generate a digital code for each selected input data signal that is used to control the operation of the duty cycle adjustment component to adjust the duty cycle of the respective input digital signal. In an embodiment, the generated digital code can be stored in a ROM memory 580 of the memory device 530 and used during processing of the digital input signal until a subsequent calibration is performed and an updated calibration result (e.g., the duty cycle calibration command) is stored in the ROM memory 580 of the memory device 530.

In an embodiment, multiple input digital signal can be calibrated in parallel. In this embodiment, the duty cycle calibration module 137 can process a duty cycle calibration command from the memory sub-system controller 515 relating to multiple selected input digital signals to be calibrated. The duty cycle calibration module 137 can perform calibration loops in parallel for the selected input digital signals to generate multiple duty cycle adjustment commands that can be sent in parallel to the multiple respective duty cycle adjustment components.

Advantageously, the calibration processing performed by the calibration system of the memory device is faster and more efficient as compared to prior approaches. For example, the calibration processing can be on the order of approximately 12.5 µs, which is approximately half of the calibration processing associated with a typical calibration process that is fully controlled by the memory sub-system controller (e.g., the WDCM method).

19

Figure 6:
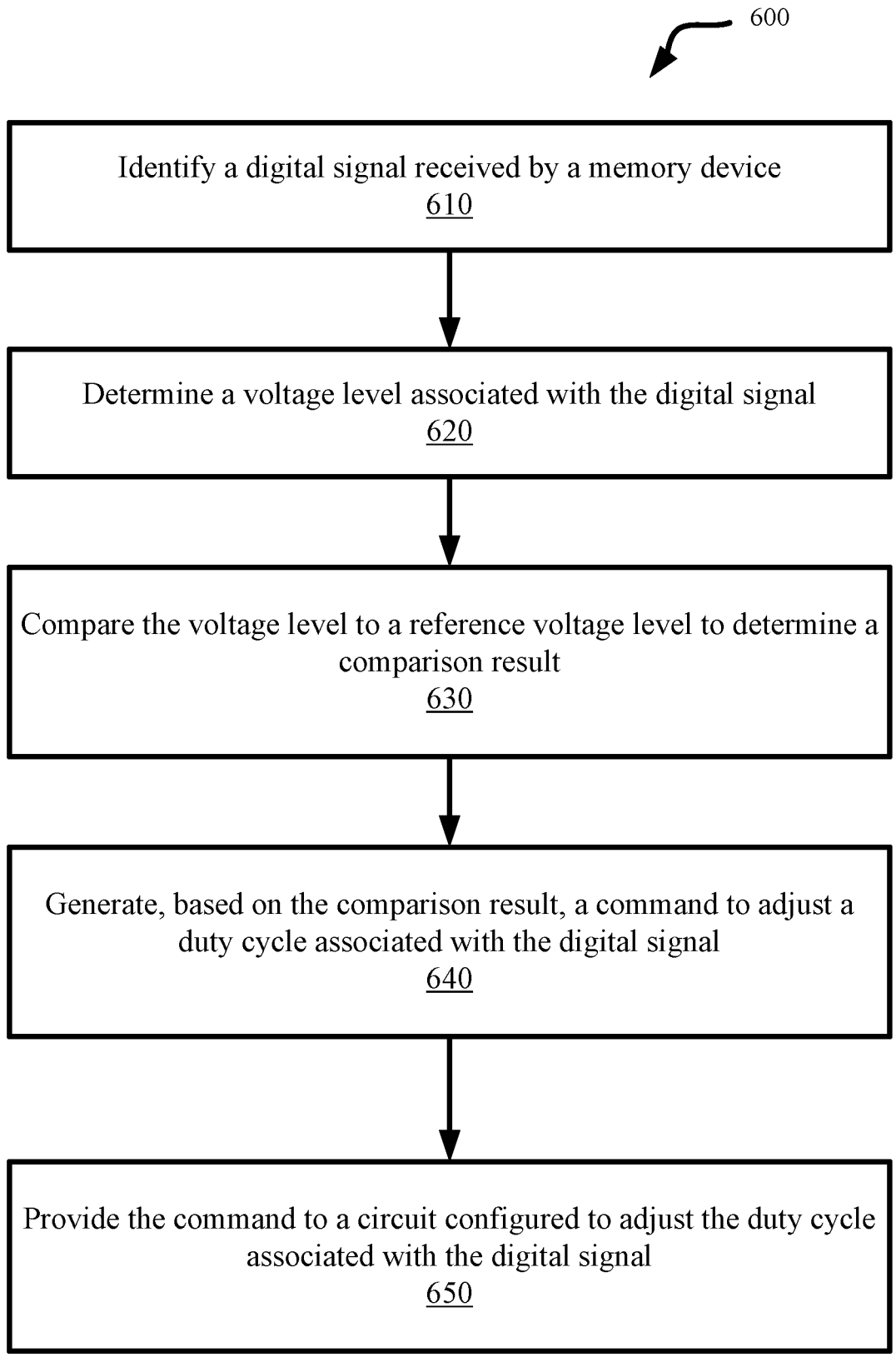
FIG. 6 illustrates a flow diagram of an example method to calibrate a write duty cycle associated with an input digital signal associated with a memory access operation (e.g., a write operation) on a memory device using a calibration process executed within the memory device, in accordance with some embodiments of the present disclosure.

FIG. 6 illustrates a flow diagram of an example method 600 to calibrate a write duty cycle associated with an input digital signal associated with a memory access operation (e.g., a write operation) on a memory device using a calibration process executed within the memory device, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the duty cycle calibration module 137 of FIGS. 1A-1B, 3, 4A, 4B, and 5.

At operation 610, a digital signal is identified. For example, processing logic (e.g., duty cycle calibration module 137) can identify a digital signal received by a memory device. In an embodiment, the digital signal can be received by the memory device in connection with the execution of a memory access operation (e.g., a write operation) to be executed on the memory device. In an embodiment, the digital signal can be associated with an input signal pin of the I/O interface associated with the memory device (e.g., $DQ_0$, $DQ_1$, $DQ_2$ ... $DQ_{N-1}$, DQS, or DQSn). In an embodiment, the digital signal is identified in response to a duty cycle calibration command received by the duty cycle calibration module 137 from a memory sub-system controller. In an embodiment, the duty cycle calibration command can identify the digital signal that is to be processed by the duty cycle calibration module 137 to calibrate a write duty cycle of the identified digital signal in connection with the execution of a write operation.

At operation 620, a voltage is determined. For example, processing logic can cause a voltage level associated with the digital signal to be determined. In an embodiment, a hardware component or circuit of the memory device can receive the digital signal identified by the processing logic and translate the digital signal to a corresponding voltage level. In an embodiment, the circuit (e.g., low pass filter 340 of FIG. 3 or low pass filter 540 of FIG. 5) can be used to determine the voltage level of the digital signal. In an embodiment, the voltage level of the digital signal is generated as the output of the low pass filter ($V_{lpf}$) for the identified digital signal.

At operation 630, a comparison is made. For example, a comparator circuit compares the voltage level to a reference voltage level to determine a comparison result. In an embodiment, the reference voltage level (Vref) is a present voltage value (e.g., Vref=Vps/2). The comparator circuit determines the comparison result which indicates if the output of the low pass filter ($V_{lpf}$) is less than the reference voltage level (e.g., a first comparison result), greater than the reference voltage level (e.g., a second comparison result), or at least substantially matches the reference voltage level. In an embodiment, the comparator circuit can determine that the low pass filter ($V_{lpf}$) at least substantially matches the reference voltage level if $V_{lpf}$=Vref or if $V_{lpf}$ is within a specified range or tolerance of Vref.

At operation 640, a command is generated. For example, the processing logic generates, based on the comparison result, a command to adjust a duty cycle associated with the digital signal. In an embodiment, the processing logic receives the comparison result and generates the command (e.g., a 4-bit digital code) that is used to calibrate the timing of the digital signal to reach a target write duty cycle level.

At operation 650, a parameter is adjusted. For example, the processing logic provides the command to a circuit configured to adjust the duty cycle associated with the digital signal. In an embodiment, the processing logic (e.g., the duty cycle calibration module 137) sends the command (e.g., the generated 4-bit digital code) to the circuit (e.g., a duty cycle adjustment component) configured to adjust the timing and write duty cycle of the identified digital signal. In an embodiment, the circuit includes a set of logic gates that can be turned on or turned off in accordance with the command to adjust the timing of the digital signal (e.g., decrease a width of the high pulse of the digital signal as shown in FIG. 4A or increase a width of the high pulse of the digital signal as shown in FIG. 4B) to calibrate the write duty cycle associated with the digital signal. In an embodiment, one or more calibration loops (e.g., operations 620-650) can be performed interactively until the write duty cycle of the digital signal reaches the target level (e.g., when the width of the high pulse of the digital signal matches the width of the low pulse of the digital signal).

Figure 7:
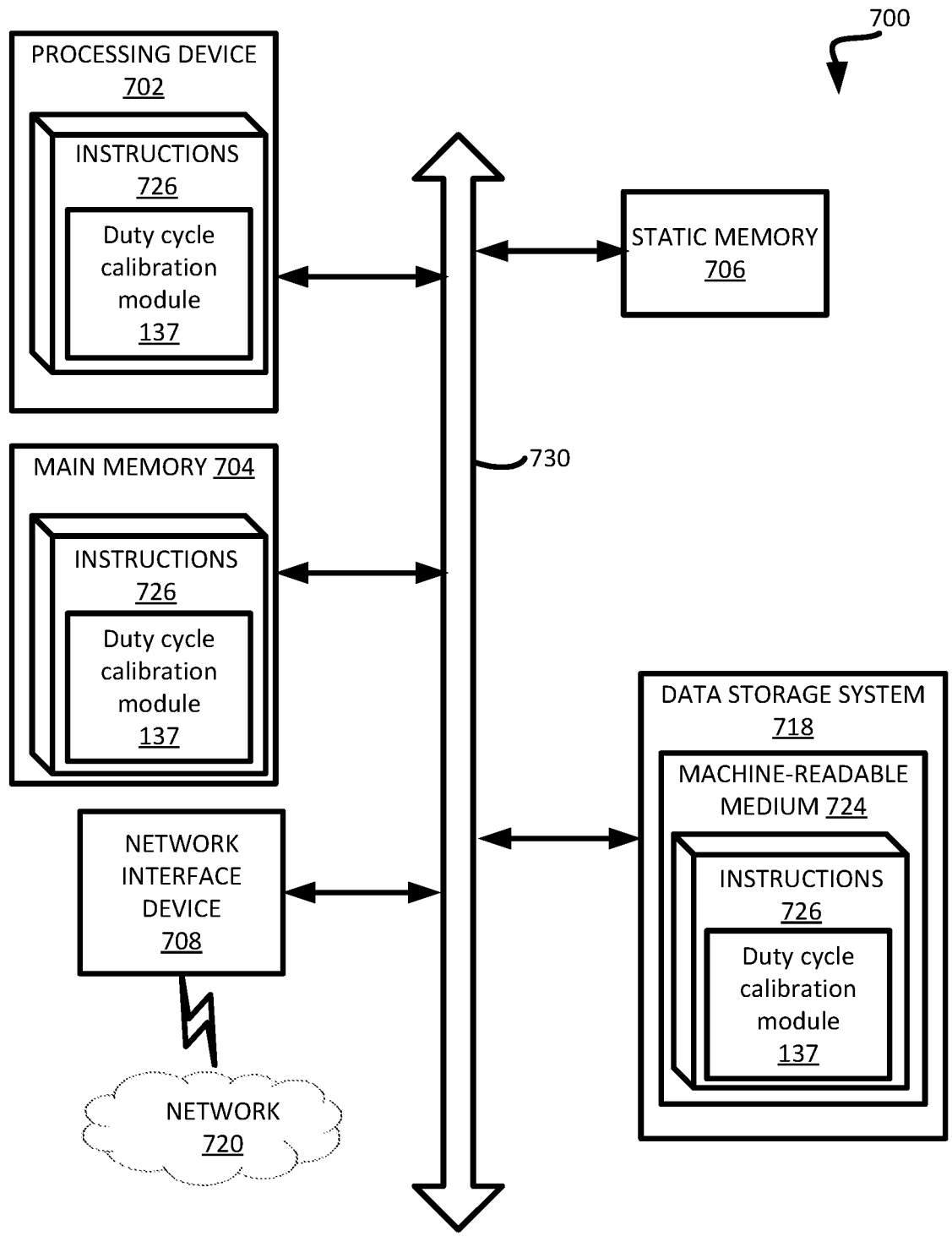
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the duty cycle calibration module 137 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 408 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1A.

In one embodiment, the instructions 726 include instructions to implement functionality corresponding to an interface management component (e.g., the interface management component 137 of FIGS. 1A, 1B, 3, 4, 6, 7, and 8). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
   a first circuit disposed within the memory device to generate a voltage level associated with a selected digital data input signal of a set of digital data input signals, wherein the selected digital data input signal corresponds to a write operation associated with one or more memory cells of the memory device;
   a second circuit disposed within the memory device to compare the voltage level to a reference voltage level to generate a comparison result;
   control logic of the memory device operatively coupled to the second circuit, the control logic to generate, based on the comparison result, a command comprising a code to adjust a duty cycle associated with the selected digital data input signal; and
   a third circuit disposed within the memory device and operatively coupled to the control logic, the third circuit to:
   receive the code from the control logic; and
   adjust the duty cycle associated with the selected digital data input signal based on the code.

2. The memory device of claim 1, wherein the control logic of the memory device receives a calibration command from a memory sub-system controller associated with the memory device, wherein the calibration command identifies the selected digital data input signal.

3. The memory device of claim 1, wherein the first circuit comprises a low pass filter.

4. The memory device of claim 1, wherein the comparison result generated by the second circuit is one of:
- the voltage level associated with the selected digital data input signal is greater than the reference voltage level; or
- the voltage level associated with the selected digital data input signal is less than the reference voltage level.

5. The memory device of claim 1, wherein the third circuit comprises a set of logic gates that are controlled based on the code.

6. The memory device of claim 1, wherein the third circuit generates an adjusted selected digital data input signal comprising an adjusted duty cycle.

7. The memory device of claim 6, wherein the first circuit generates an updated voltage level associated with the adjusted selected digital data input signal; wherein the second circuit compares the updated voltage level to the reference voltage level to generate an updated comparison result; and wherein the control logic generates, based on the updated comparison result, an updated command to adjust the adjusted duty cycle associated with the adjusted selected digital data input signal.

8. The memory device of claim 1, wherein the duty cycle is adjusted by the third circuit to a target duty cycle level.

9. A memory device comprising:
- an array of memory cells;
- a first circuit disposed within the memory device to generate a voltage level associated with a selected digital data input signal of a set of digital data input signals, wherein the selected digital data input signal corresponds to a write operation associated with one or more memory cells of the memory device;
- a second circuit disposed within the memory device to compare the voltage level to a reference voltage level to generate a comparison result; and
- control logic of the memory device, operatively coupled with the array of memory cells, to perform operations comprising generating, based on the comparison result, a command to adjust a duty cycle associated with the selected digital data input signal.

10. The memory device of claim 9, wherein the control logic provides the command to a third circuit disposed within the memory device, and wherein the third circuit is configured to adjust the duty cycle of the selected digital data input signal in accordance with the command.

11. The memory device of claim 9, wherein the first circuit comprises a low pass filter.

12. The memory device of claim 11, wherein the second circuit comprises a comparator circuit configured to generate the comparison result.

13. The memory device of claim 9, further comprising a third circuit configured to adjust the duty cycle of the selected digital data input signal based on the command received from the control logic.

14. A method comprising:
- generating, by a first circuit of a memory device, a voltage level associated with a selected digital data input signal of a set of digital data input signals, wherein the selected digital data input signal corresponds to a write operation associated with one or more memory cells of the memory device;
- comparing, by a second circuit of the memory device, the voltage level to a reference voltage level to generate a comparison result;
- generating, by a processing device of the memory device, based on the comparison result, a command comprising a code to adjust a duty cycle associated with the selected digital data input signal; and
- adjusting, by a third circuit of the memory device, the duty cycle associated with selected digital data input signal based on the code.

15. The method of claim 14, further comprising receiving a calibration command from a memory sub-system controller associated with the memory device, wherein the calibration command identifies the selected digital data input signal.

16. The method of claim 14, wherein the comparison result is one of:
- the voltage level associated with the selected digital data input signal is greater than the reference voltage level; or
- the voltage level associated with the selected digital data input signal is less than the reference voltage level.

17. The method of claim 14, wherein the duty cycle is adjusted by controlling a set of logic gates based on the code.

18. The method of claim 14, further comprising generating an adjusted selected digital data input signal comprising an adjusted duty cycle.

19. The method of claim 18, further comprising:
- generating, by the first circuit of the memory device, an updated voltage level associated with the adjusted selected digital data input signal;
- comparing, by the second circuit of the memory device, the updated voltage level to the reference voltage level to generate an updated comparison result; and
- generating, based on the updated comparison result, an updated command comprising an updated code to adjust the adjusted duty cycle associated with the adjusted selected digital data input signal.

20. The method of claim 14, wherein the duty cycle is adjusted to a target duty cycle level.

* * * * *